(12) United States Patent
Hu

(10) Patent No.: US 7,937,810 B2
(45) Date of Patent: May 10, 2011

(54) FLAT PANEL DISPLAY SUPPORT

(75) Inventor: Chi-Lung Hu, Shulin (TW)

(73) Assignee: Shin Zu Shing Co., Ltd., Taipei Hsein (TW)

( * ) Notice: Subject to any disclaimer, the term of this patent is extended or adjusted under 35 U.S.C. 154(b) by 346 days.

(21) Appl. No.: 12/218,388

(22) Filed: Jul. 15, 2008

(65) Prior Publication Data
US 2010/0012812 A1 Jan. 21, 2010

(51) Int. Cl.
*E05D 7/06* (2006.01)

(52) U.S. Cl. .......... 16/241; 248/447; 248/454; 248/919; 16/322; 16/319

(58) Field of Classification Search .......... 248/447, 248/454, 455, 456, 457, 458, 460, 462, 463, 248/465, 371, 395, 397, 284.1, 291.1, 292.12, 248/292.13, 917, 919, 923; 361/679.21, 361/679.27, FOR. 104; 40/754, 755, 756, 40/749, 779; 16/239, 241, 322, 319, 374
See application file for complete search history.

(56) References Cited

U.S. PATENT DOCUMENTS

| | | | |
|---|---|---|---|
| 6,301,101 B1 * | 10/2001 | Anzai et al. ................. | 361/679.3 |
| 6,651,943 B2 * | 11/2003 | Cho et al. .................... | 248/122.1 |
| 6,899,311 B1 * | 5/2005 | Ternus ........................... | 248/454 |
| 7,450,372 B2 * | 11/2008 | Lin et al. ................... | 361/679.55 |
| 2003/0089832 A1 * | 5/2003 | Gold ............................ | 248/454 |
| 2009/0140119 A1 * | 6/2009 | To et al. ........................ | 248/455 |

* cited by examiner

*Primary Examiner* — A. Joseph Wujciak, III
(74) *Attorney, Agent, or Firm* — William E. Pelton, Esq.; Cooper & Dunham LLP

(57) ABSTRACT

A flat panel display (FPD) support has a panel bracket being attached to an FPD, two hinge assemblies being mounted on the panel bracket and an U-shaped supporting bracket being attached to the hinge assemblies. The supporting bracket supports the FPD to allow the FPD to stand on a plane and can pivot to adjust an angle of the FPD relative to the plane with the hinge assemblies. The FPD with the FPD support shows a light, simple and portable shape, can be conveniently packaged for sell or moving and will not occupy life space while using.

9 Claims, 6 Drawing Sheets

FLAT PANEL DISPLAY SUPPORT

BACKGROUND OF THE INVENTION

1. Field of the Invention

The present invention relates to a flat panel display (FPD) support, especially to an FPD support that holds an FPD to stand on a plane and to adjust a visual angle of the FPD.

2. Description of the Prior Arts

A flat panel display (FPD) is mounted on an FPD support with a hinge. The hinge allows the FPD to rotate relative to the FPD support and to adjust a visual angle of the FPD.

A conventional FPD support has a large base to stand stably on a plane. However, the large base of the conventional FPD support also occupies large space that is not easy for people to place and stow the FPD with the conventional FPD support.

To overcome the shortcomings, the present invention provides an FPD support to mitigate or obviate the aforementioned problems.

SUMMARY OF THE INVENTION

The main objective of the present invention is to provide a flat panel display (FPD) support that has a panel bracket being attached to an FPD, two hinge assemblies being mounted on the panel bracket and an U-shaped supporting bracket being attached to the hinge assemblies.

The supporting bracket supports the FPD to allow the FPD to stand on a plane and can pivot to adjust an angle of the FPD relative to the plane with the hinge assemblies. The FPD with the FPD support shows a light, simple and portable shape, can be conveniently packaged for sell or moving and will not occupy life space while using.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
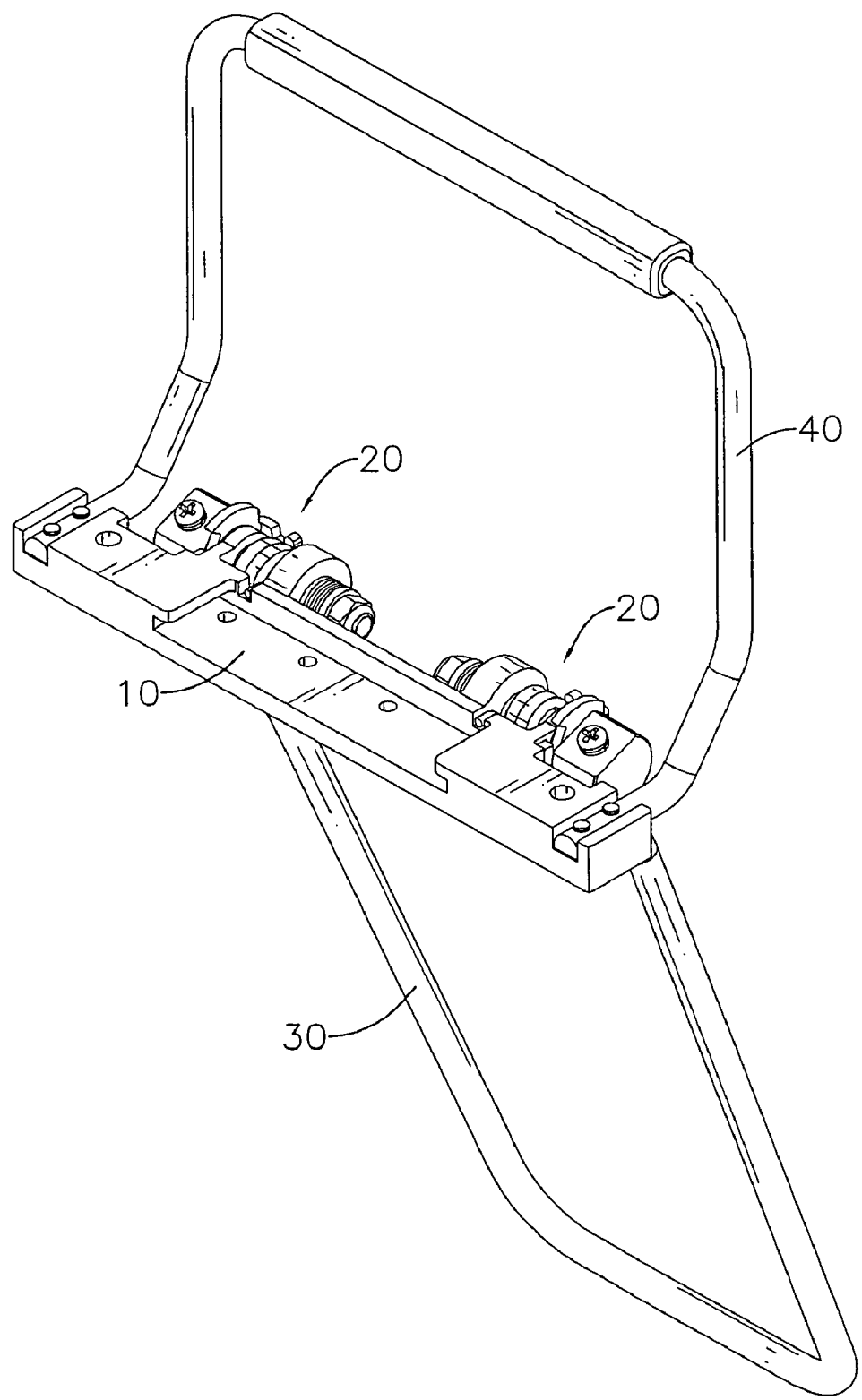
FIG. 1 is a perspective view of a flat panel display (FPD) support in accordance with the present invention.

With reference to FIG. 1, a flat panel display (FPD) support in accordance with the present invention comprises a panel bracket (10), two hinge assemblies (20) and a supporting bracket (30) and may have a holding bracket (40).

Figure 2:
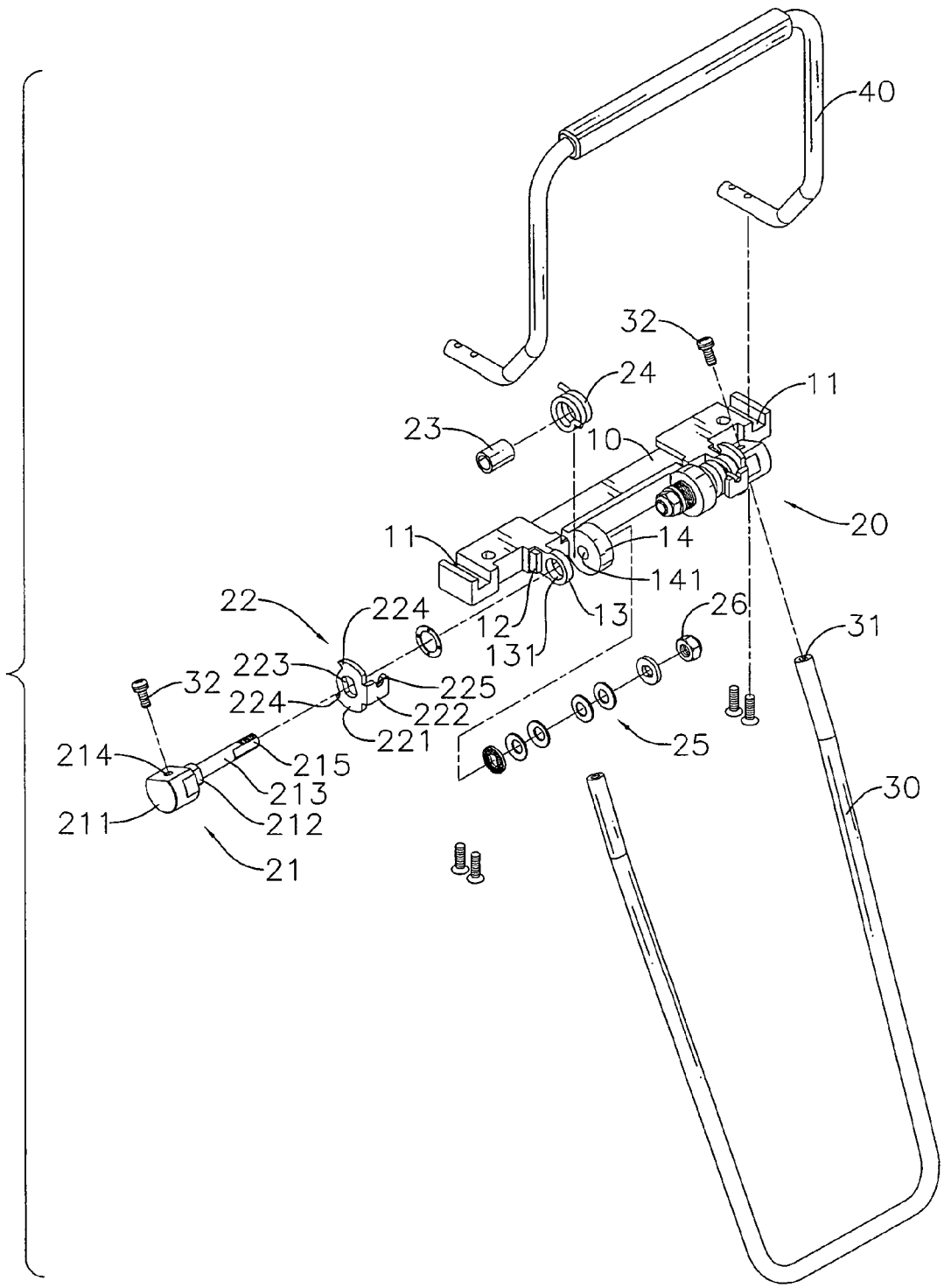
FIG. 2 is a partially exploded perspective view of the FPD support in FIG. 1.
Figure 5:
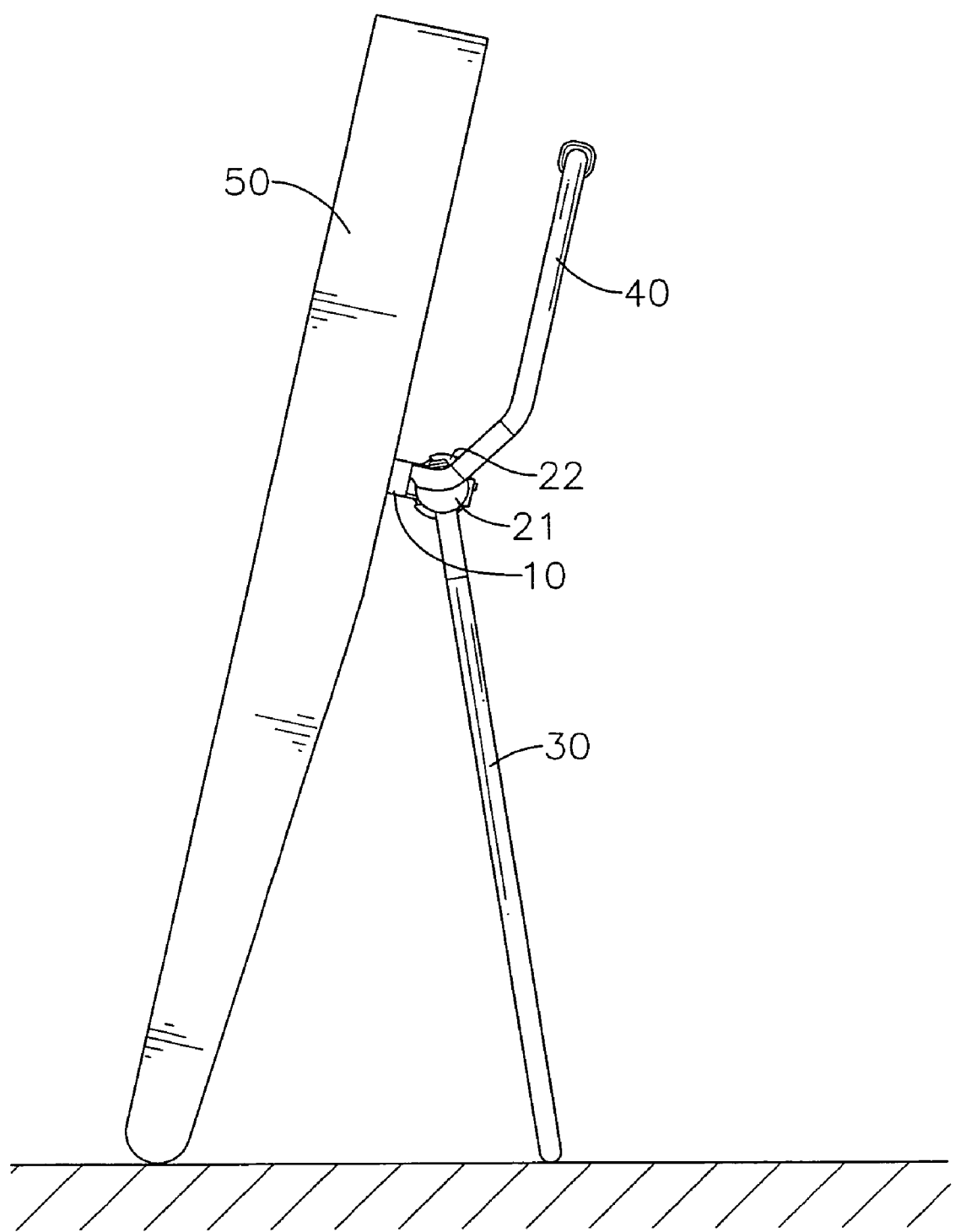
FIG. 5 is a side view of the PFD support in FIG. 1 with an FPD.

With further reference to FIGS. 2 and 5, the panel bracket (10) is attached to an FPD (50) and has two opposite ends, an upper surface, a mounting surface, two mounting recesses (11) and two hinge mounts.

The mounting recess (11) is formed in the upper surface of the panel bracket (10) and is respectively adjacent to the ends of the panel bracket (10).

The hinge mounts are formed on the panel bracket (10) and are respectively adjacent to the ends of the panel bracket (10). Each hinge mount has a stopper (12), a guiding ring (13) and a mounting spacer (14).

The stopper (12) is formed on the mounting surface of the panel bracket (10) and has two opposite ends.

The guiding ring (13) is formed on the mounting surface of the panel bracket (10), may be adjacent to the stopper (12) and has a through hole (131). The through hole (131) is formed through the guiding rings (13).

The mounting spacer (14) is formed on the mounting surface of the panel bracket (10) and has two ends and a mounting hole (141). The mounting hole (141) is formed through the mounting spacer (14) and aligns with the through hole (131) of the guiding ring (13).

The hinge assemblies (20) are respectively mounted on the hinge mounts of the panel bracket (10). Each hinge assembly (20) has a shaft (21), a connector (22), a sleeve (23), a spring (24), a washer assembly (25) and a fastener (26).

The shaft (21) is mounted rotatably through the through hole (131) of the guiding ring (13) and the mounting hole (141) of the mounting spacer (14) and has an enlarged head (211), an engaging protrusion (212) and a pivot rod (213). The enlarged head (211) has a side surface and an end surface and may have a through hole (214). The through hole (214) is formed through the side surface of the enlarged head (211). The engaging protrusion (212) is formed on and protrudes from the end surface of the enlarged head (211), is non-circular in cross-section, may correspond to the stopper (12) of the panel bracket (10) and has a distal end. The pivot rod (213) is formed on and protrudes from the distal end of the engaging protrusion (212), is mounted through the through hole (131) of the guiding ring (13) and the mounting hole (141) of the mounting spacer (14) and has a distal mounting end (215). The distal mounting end (215) of the pivot rod (213) is non-circular in-cross-section and protrudes out of the mounting spacer (14) of the panel bracket (10).

Figure 3:
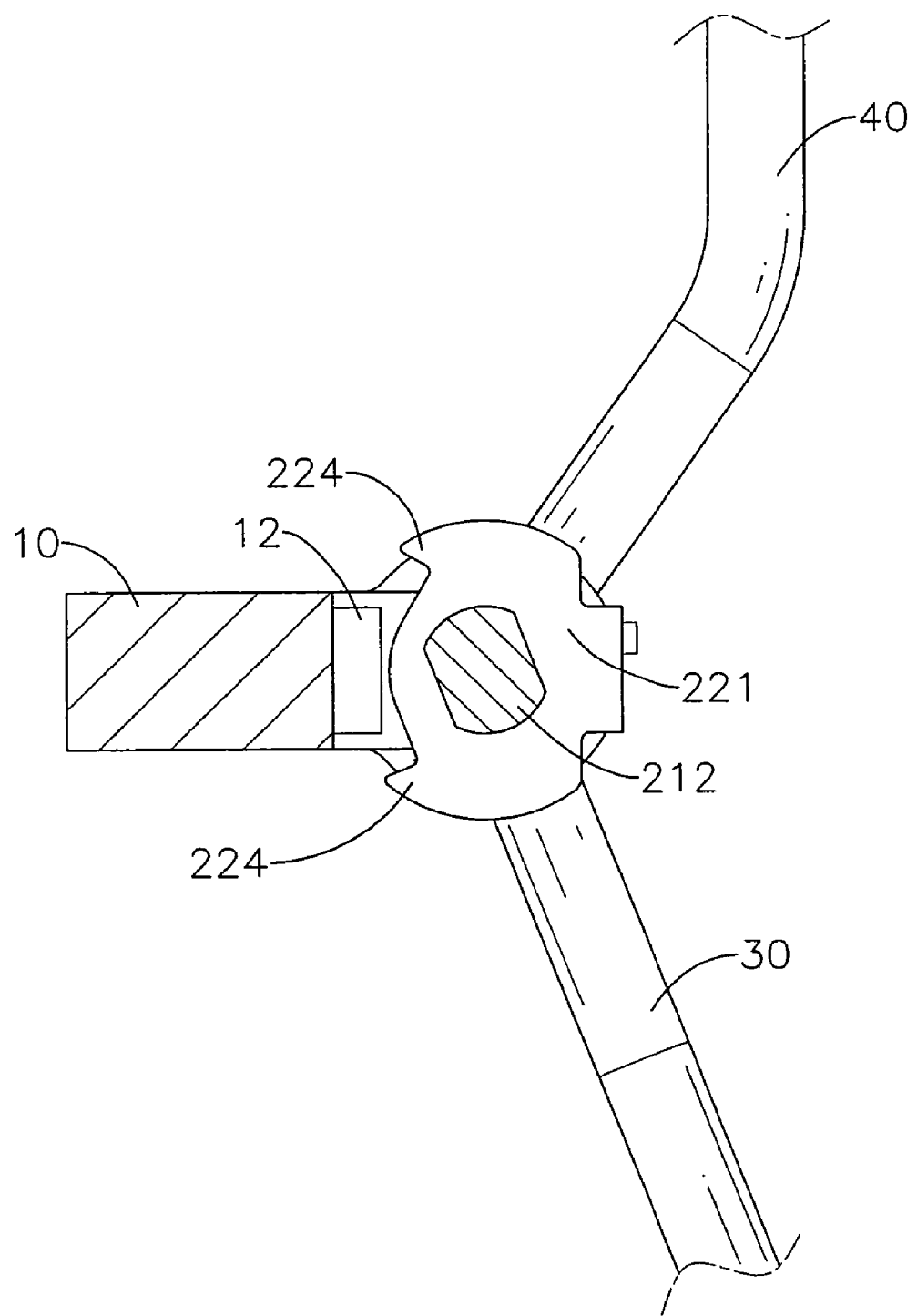
FIG. 3 is an enlarged side view in partial section of the PFD support in FIG. 1.
Figure 4:
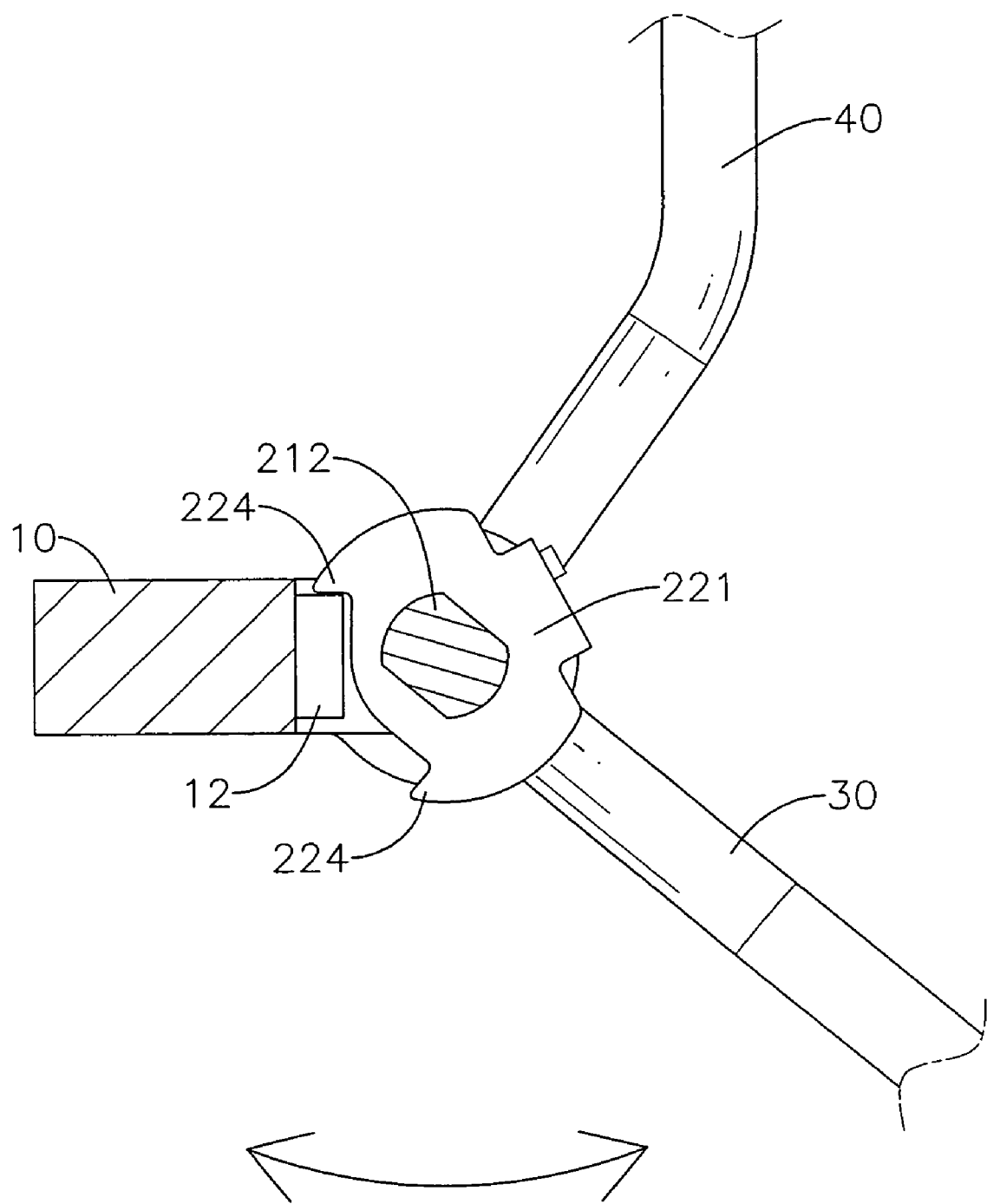
FIG. 4 is an enlarged operational side view in partial section of the PFD support in FIG. 1.

With further reference to FIGS. 3 and 4, the connector (22) is securely mounted around the shaft (21) and may have a positioning wing (221) and an abutting wing (222). The positioning wing (221) is securely mounted around the engaging protrusion (212) of the shaft (21), corresponds to the stopper (12) of the panel bracket (10) and has an annular edge, a positioning hole (223) and two limiting protrusions (224). The positioning hole (223) is formed through the positioning wing (221) and is securely mounted around the engaging protrusion (212) of the shaft (21). The limiting protrusions (224) are formed on and protrude from the annular edge of the positioning wing (221) and respectively correspond to and selectively abut the ends of the stopper (12) of the panel bracket (10) to limit a rotation angle of the shaft (21). The abutting wing (222) is formed transversely from the annular edge of the positioning wing (221), is mounted beside and between the guiding ring (13) and the mounting spacer (14) and has an upper edge and a mounting recess (225). The mounting recess (225) is formed in the upper edge of the abutting wing (222).

The sleeve (23) is mounted between the guiding ring (13) and the mounting spacer (14) of the panel bracket (10) and is mounted around the pivot rod (213) of the shaft (21).

The spring (24) is mounted around the pivot rod (213) of the shaft (21) and between the guiding ring (13) and the mounting spacer (14) of the panel bracket (10), may be mounted around the sleeve (23) to avoid the abrasion between the spring (24) and the shaft (21) and has two ends. The ends of the spring (24) respectively abut the panel bracket (10) and the connector (22). One of the ends of the spring (24) may abut the abutting wing (222) of the connector (22) and may be mounted in the mounting recess (225) of the abutting wing (222) of the connector (22).

The washer assembly (25) is securely mounted around the distal mounting end (215) of the pivot rod (213) of the shaft (21) adjacent to the ends of the mounting spacer (14) of the panel bracket (10) to provide a frictional force of the hinge assembly (20).

The fastener (26) is mounted securely on the distal mounting end (215) of the pivot rod (213) of the shaft (21) to hold the washer assembly (25) between the mounting spacer (14) of the panel bracket (10) and the fastener (26).

Figure 6:
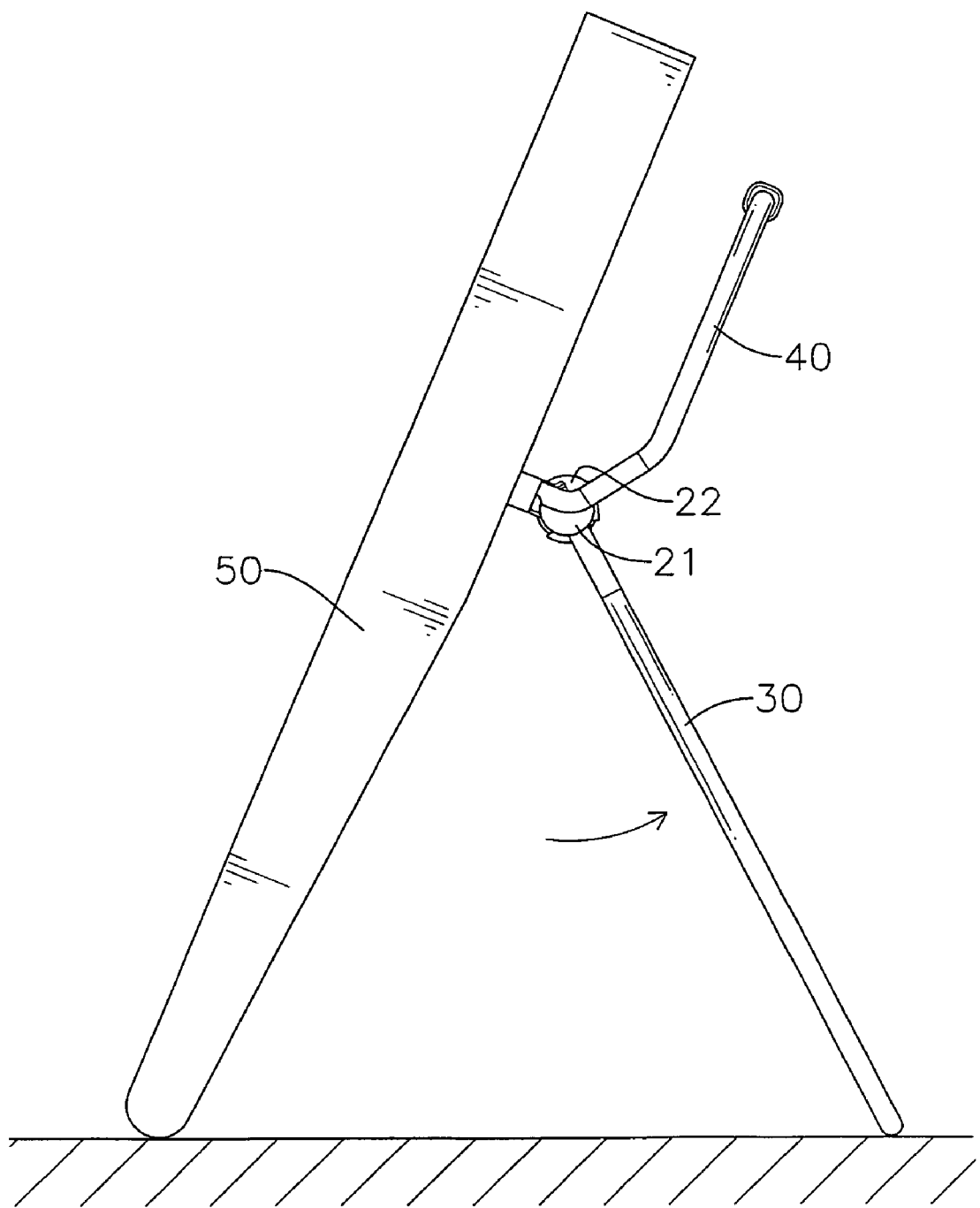
FIG. 6 is an operational side view of the PFD support in FIG. 1 with an FPD.

With further reference to FIGS. 5 and 6, the supporting bracket (30) is U-shaped, is attached to the hinge assemblies (20) has two ends and may have two fastening holes (31) and two fasteners (32). The fastening holes (31) are respectively formed in the ends of the supporting bracket (30) and respectively align with the through holes (214) of the shafts (21) of the hinge assemblies (20). The fasteners (32) are respectively mounted through the through holes (214) of the shafts (21) of the hinge assemblies (20) and fasten into the fastening holes (31) of the supporting bracket (30).

The holding bracket (40) is U-shaped, is attached to the panel bracket (10) and may have two end parts. The end parts of the holding bracket (40) are respectively and securely mounted in the mounting recesses (11) of the panel bracket (10). A user can hold the holding bracket (40) to lift and remove the FPD (50) and the user can also hold the supporting bracket (30) and the holding bracket (40) with his two hands to pivot the supporting bracket (30) and the hinge assemblies (20).

The FPD support as described has the following advantages. The FPD (50) can reclined on the supporting bracket (30). The supporting bracket (30) supports the FPD (50) to allow the FPD (50) to stand on the plane and can pivot to adjust an angle of the FPD (50) relative to the plane with the hinge assemblies (20). The FPD (50) with the FPD support as described shows a light, simple and portable shape, can be conveniently packaged for sell or moving and will not occupy life space while using.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A flat panel display (FPD) support comprising
a panel bracket having
two opposite ends;
an upper surface;
a mounting surface; and
two hinge mounts being formed on the panel bracket, being respectively adjacent to the ends of the panel bracket and each hinge mount having
a guiding ring being formed on the mounting surface of the panel bracket and having a through hole being formed through the guiding rings; and
a mounting spacer being formed on the mounting surface of the panel bracket and having two ends; and
a mounting hole being formed through the mounting spacer and aligning with the through hole of the guiding ring;

two hinge assemblies being respectively mounted on the hinge mounts of the panel bracket, and each hinge assembly having
a shaft being mounted rotatably through the through hole of a corresponding guiding ring and the mounting hole of a corresponding mounting spacer and having
an enlarged head having an end surface;
an engaging protrusion being formed on and protruding from the end surface of the enlarged head, being non-circular in cross-section and having a distal end; and
a pivot rod being formed on and protruding from the distal end of the engaging protrusion, being mounted through the through hole of the corresponding guiding ring and the mounting hole of the corresponding mounting spacer and having a distal mounting end being non-circular in cross-section and protruding out of the corresponding mounting spacer of the panel bracket;
a connector being securely mounted around the shaft;
a spring being mounted around the pivot rod of the shaft and between the corresponding guiding ring and the corresponding mounting spacer of the panel bracket and having two ends respectively abutting the panel bracket and the connector;
a washer assembly being securely mounted around the distal mounting end of the pivot rod of the shaft adjacent to the ends of the corresponding mounting spacer of the panel bracket; and
a fastener being mounted securely on the distal mounting end of the pivot rod of the shaft; and
a supporting bracket being U-shaped and being attached to the hinge assemblies.

2. The FPD support as claimed in claim 1 further has a holding bracket being U-shaped and being attached to the panel bracket.

3. The FPD support as claimed in claim 2, wherein
each hinge mount further has a stopper being formed on the mounting surface adjacent to a corresponding guiding ring of the panel bracket, corresponding to the engaging protrusion of a corresponding shaft and having two opposite ends;
the connector of each hinge assembly further has
a positioning wing being securely mounted around the engaging protrusion of the shaft, corresponding to the stopper of a corresponding hinge mount of the panel bracket and having
an annular edge;
a positioning hole being formed through the positioning wing and being securely mounted around the engaging protrusion of the shaft; and
two limiting protrusions being formed on and protruding from the annular edge of the positioning wing and respectively corresponding to and selectively abutting the ends of the stopper of the corresponding hinge mount of the panel bracket; and
an abutting wing being formed transversely from the annular edge of the positioning wing, being mounted beside and between the corresponding guiding ring and the corresponding mounting spacer; and
one of the ends of the spring of each hinge assembly abuts the abutting wing of the connector.

4. The FPD support as claimed in claim 3, wherein
each hinge assembly further has a sleeve being mounted between the corresponding guiding ring and the corresponding mounting spacer of the panel bracket and around the pivot rod of the shaft; and the spring of each hinge assembly is mounted around the sleeve.

5. The FPD support as claimed in claim 4, wherein the abutting wing of the connector of each hinge assembly further has
- an upper edge; and
- a mounting recess being formed in the upper edge of the abutting wing;

one of the ends of the spring of each hinge assembly is mounted in the mounting recess of the abutting wing of the connector of each hinge assembly;

the enlarged head of the shaft of each hinge assembly further has
- a side surface; and
- a through hole being formed through the side surface of the enlarged head; and the supporting bracket further has
- two ends;
- two fastening holes being respectively formed in the ends of the supporting bracket and respectively aligning with the through holes of the shafts of the hinge assemblies; and
- two fasteners being respectively mounted through the through holes of the shafts of the hinge assemblies and fastening into the fastening holes of the supporting bracket.

6. The FPD support as claimed in claim 5, wherein the panel bracket further has two mounting recesses being formed in the upper surface of the panel bracket and being respectively adjacent to the ends of the panel bracket; and the holding bracket further has two end parts being respectively and securely mounted in the mounting recesses of the panel bracket.

7. The FPD support as claimed in claim 1, wherein each hinge mount further has a stopper being formed on the mounting surface adjacent to a corresponding guiding ring of the panel bracket, corresponding to the engaging protrusion of a corresponding shaft and having two opposite ends;

the connector of each hinge assembly further has
- a positioning wing being securely mounted around the engaging protrusion of the shaft, corresponding to the stopper of a corresponding hinge mount of the panel bracket and having
  - an annular edge;
  - a positioning hole being formed through the positioning wing and being securely mounted around the engaging protrusion of the shaft; and
  - two limiting protrusions being formed on and protruding from the annular edge of the positioning wing and respectively corresponding to and selectively abutting the ends of the stopper of the corresponding hinge mount; and
- an abutting wing being formed transversely from the annular edge of the positioning wing, being mounted beside and between the corresponding guiding ring and the corresponding mounting spacer; and one of the ends of the spring of each hinge assembly abuts the abutting wing of the connector.

8. The FPD support as claimed in claim 7, wherein each hinge assembly further has a sleeve being mounted between the corresponding guiding ring and the corresponding mounting spacer of the panel bracket and around the pivot rod of the shaft; and the spring of each hinge assembly is mounted around the sleeve.

9. The FPD support as claimed in claim 8, wherein the abutting wing of the connector of each hinge assembly further has
- an upper edge; and
- a mounting recess being formed in the upper edge of the abutting wing;

one of the ends of the spring of each hinge assembly is mounted in the mounting recess of the abutting wing of the connector of each hinge assembly;

the enlarged head of the shaft of each hinge assembly further has
- a side surface; and
- a through hole being formed through the side surface of the enlarged head; and the supporting bracket further has
- two ends;
- two fastening holes being respectively formed in the ends of the supporting bracket and respectively aligning with the through holes of the shafts of the hinge assemblies; and
- two fasteners being respectively mounted through the through holes of the shafts of the hinge assemblies and fastening into the fastening holes of the supporting bracket.

* * * * *